Feb. 13, 1962 H. NAGENBORG, JR., ETAL 3,020,933
BUFFER STOP FOR POWER LOOMS
Filed Feb. 16, 1959
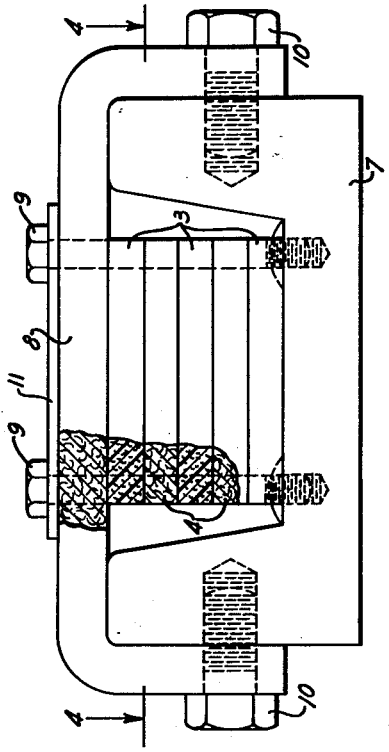
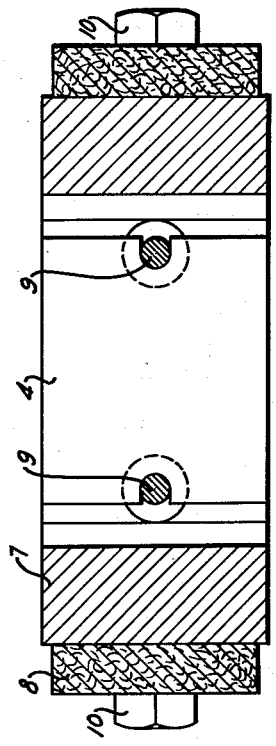
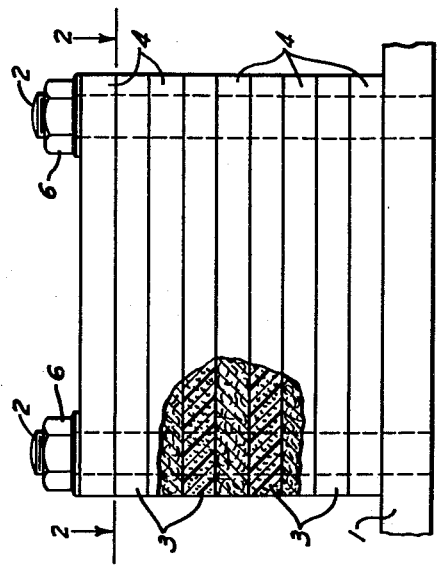
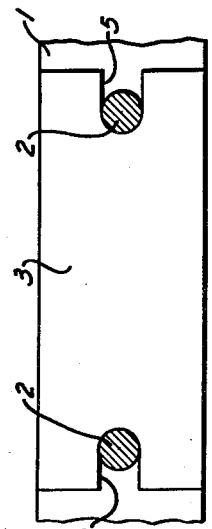
INVENTORS
HEINRICH NAGENBORG, JR.,
FRANZ GOTTFRIED REUTER
BY
ATTORNEYS

United States Patent Office 3,020,933
Patented Feb. 13, 1962

3,020,933
BUFFER STOP FOR POWER LOOMS
Heinrich Nagenborg, Jr., Vreden, Bezirk Munster, and Franz Gottfried Reuter, Lemforde, Hannover, Germany, assignors, by mesne assignments, to Mobay Chemical Company, Pittsburgh, Pa., a corporation of Delaware
Filed Feb. 16, 1959, Ser. No. 793,513
Claims priority, application Germany Feb. 22, 1958
8 Claims. (Cl. 139—166)

This invention relates generally to a buffer stop suitable for use on power looms and, more particularly, to a novel and improved means for checking a picker stick.

A profiled leather cushion is ordinarily used for checking the movement of the picker stick on power looms. Checking the picker stick is necessary because the latter propels the shuttle with considerable energy and has to be brought to a sudden stop at the end position without any appreciable deceleration distance. Although the presently used leather cushions prevent the destruction of the picker stick, they are not entirely satisfactory since they deteriorate rather rapidly and have to be replaced periodically. Another objection to the presently used leather cushions is the fact that they do not sufficiently dampen the noise caused by the beats of the picker stick. Finally, the presently used leather cushions fail to take the load from those portions of the loom that support it and are under the impact of the picker stick.

It is, therefore, a primary object of the present invention to provide a buffer stop which is devoid of the shortcomings of the heretofore used leather cushions. Another object of the present invention is to provide a buffer stop adapted for use on power looms which stands up under the beats of the picker stick. Another object of the invention is to provide a buffer stop for power looms which need not be replaced after short periods of use. Another object is to provide a buffer stop which dampens the noise of the picker stick. A further object is to provide a buffer stop which prevents wear and tear of those parts of the loom which hold it. Still further objects will become apparent from the following description with reference to the accompanying diagrammatic drawings in which:

FIGURE 1 is an elevation view, partially in section, of a buffer stop according to one embodiment of the invention;

FIGURE 2 is a sectional view taken in the direction of the arrows 2:2 in FIGURE 1;

FIGURE 3 is an elevation view, partially in section, of a buffer stop according to another embodiment of the invention; and FIGURE 4 is a sectional view taken in the direction of the arrows 4:4 in FIGURE 3.

In accordance with the buffer stop for power looms described in U.S. Patent Number 2,972,360, filed August 21, 1957, by us, Franz Gottfried Reuter and Heinrich Nagenborg, Jr., of which this application is a continuation-in-part, the foregoing objects are accomplished by providing a buffer stop comprising an elastic body made of a plurality of layers of polyurethane rubber in a holder made of a rigid material.

Because of the multiple layer construction of the buffer stop, it can be given a spring diagram which has a steep slope but no discontinuity. On the other hand, the rigid holder prevents any undesirable yielding of the elastic body and thus assists in absorbing shock. According to one preferred embodiment, the elastic body of the buffer stop comprises at least one layer of a foam or cellular polyurethane rubber placed between two layers of homogeneous or non-cellular polyurethane rubber.

Generally speaking, in accordance with the instant invention, the foregoing objects as well as others are achieved by providing a buffer stop for power looms of an elastic body comprising alternating layers of a cellular polyurethane rubber and leather or leather-like material. The improved buffer stop according to the invention provides a decrease of the deceleration distance required to check the movement of the picker stick and reduces an annoying back-lash effect, both without appreciably reducing the necessary elasticity of the buffer stop. The intermediate layers of leather and the like form stabilizing support surfaces while the cellular polyurethane rubber spaced therebetween provides the elastic cushioning effect necessary to prevent damage to either the buffer stop or the picker stick.

The buffer stop provided in accordance with the invention may be modified by providing the cellular polyurethane rubber layers of different thickness or providing cellular polyurethane rubber layers of different resiliences so that buffer stops having a wide variety of elastic properties may be provided.

In one preferred embodiment, a buffer stop is constructed by first adhesively bonding one layer of cellular polyurethane plastic to one layer of leather or leather-like material. The composite cellular polyurethane rubber-leather elements are then assembled into the buffer stop by mounting one composite element on a rigid support, preferably of metal, and placing at least one other composite element onto said first element and, preferably, thereafter placing a single layer of leather or leather-like material on the last composite cellular polyurethane rubber-leather element to provide a buffer stop having alternating cellular polyurethane rubber and leather layers. It may, however, be advantageous to arrange all of the alternating layers of the buffer loosely, one on the other, in alternating relation or to bond all the alternating layers together to form a single block. It is always advantageous, however, to provide a separate, easily removable leather top layer, opposite the picker stick, because the top layer is subjected to the severest stress and must periodically be replaced.

The elastic cushion must be held in place on the rigid support. Preferably, this is accomplished by mounting the element on the support by at least two points. It is also often advantageous to place the elastic cushion under a constant stress or a "prestress."

Referring again to the drawings for a more detailed description of the invention, FIGURE 1 illustrates one preferred embodiment of the invention comprising a metallic support member 1 having stud bolts 2 attached thereto in perpendicular relation. Layers of a cellular polyurethane rubber 3 and of leather 4 are mounted on the metal support 1 between the stud bolts 2 in alternating relation and with the top layer being of leather. All of the layers are provided with notches 5 as is best shown in FIGURE 2 which engage the stud bolts 2. The cushion is held in place by hexagon nuts 6 which may be readily removed so that the entire elastic cushion or individual layers thereof may be replaced. The buffer stop may be prestressed by tightening the hexagon nuts 6.

FIGURE 3 illustrates a conventional buffer stop assembly which has been modified to include the novel elastic cushion of the invention. A rigid shaped buffer holder 7 is provided having a conventional U-shaped leather buffer 8 mounted thereon and held securely in place by bolts 10 which seat in the sides of the shaped buffer holder 7. The central portion of the buffer holder 7 is recessed and a plurality of alternating cellular polyurethane rubber layers 3 and leather layers 4 are placed therein between the conventional leather buffer 8 and the buffer support 7. Bolts 9 are provided to hold the alternating layers firmly in position. The bolts 9 successively pass through a relatively flat easily removable leather member 11, the conventional leather buffer 8, into notches provided in the alternating layers of the buffer stop as best shown in FIGURE 4.

Any suitable cellular polyurethane rubber may be used in accordance with the invention provided the cellular polyurethane rubber has a density of at least about 20 pounds per cubic foot and is prepared by reacting a substantially linear hydroxyl polyester of the alkyd type with an excess of an organic diisocyanate and subsequently adding to the reactive mixture a polyhydric alcohol and water followed by curing at elevated temperatures. Any suitable formulation may be used to produce the cellular polyurethane rubber layers contained in the buffer stops of the invention. Suitable starting materials for cellular polyurethane rubber have been disclosed in the literature, such as United States Patents 2,620,516; 2,621,166; 2,729,618; 2,764,565; and 2,778,810; the disclosure of which is incorporated herein by reference.

The following example illustrates the preparation of one cellular polyurethane rubber adapted to serve as the material of the cellular polyurethane rubber layers of the buffer stops of the invention, but it is to be understood that the formulation is given by way of illustration, and not of limitation.

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 200 parts by weight of naphthalene-1,5-diisocyanate are added to the dehydrated polyester at 135° C. while stirring. As soon as the temperature starts to drop, 20 parts of butylene glycol-1,4 are stirred into the mixture within a period of one minute at about 130° C. and subsequently 6 parts by weight of water are added while stirring. The resulting mixture forms a foamed or cellular polyurethane rubber on standing and is cured at a temperature of about 110° C. for about 24 hours.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

While the resiliency of the cellular polyurethane rubber layers may vary within wide limits, it is preferred that the resiliency of the cellular polyurethane be from about 35% to about 75%.

What is claimed is:

1. A buffer stop for a loom adapted to check the movement of a picker stick which comprises a support member and an elastic cushion including a plurality of leather layers and cellular elastic polyurethane layers arranged alternately and disposed on said support member, said polyurethane layers having a density of at least about 20 pounds per cubic foot, the layer furthest removed from said support member being leather, the edges of substantially all of said layers having a plurality of notches and a plurality of stud members secured to said support member and disposed within said notches for holding said plurality of layers in position.

2. The buffer stop of claim 1 in which said plurality of layers are held under compression.

3. The buffer stop according to claim 1, wherein said cushion comprises a plurality of elements, each element comprising a layer of a cellular elastic polyurethane rubber adhesively bonded to a layer of leather.

4. The buffer stop according to claim 1, wherein said cellular elastic polyurethane rubber layers have equal thickness.

5. The buffer stop according to claim 1, wherein said cellular elastic polyurethane rubber layers have unequal thickness.

6. The buffer stop according to claim 1, wherein said layers are adhesively bonded together, thereby forming a one-piece cushion.

7. The buffer stop according to claim 1, wherein the layer furthest removed from the support member comprises an easily removable layer of leather.

8. A buffer stop for a loom adapted to check the movement of a picker stick which comprises a support member and an elastic cushion including a plurality of leather layers and cellular polyurethane layers arranged alternately and disposed on said support member, said polyurethane layers having a density of at least about 20 pounds per cubic foot, the layer furthest removed from said support member being leather, the edges of substantially all of said layers having a plurality of notches and a plurality of stud members secured to said support member and disposed within said notches for holding said plurality of layers in position, said cellular polyurethane layers having different elasticities.

References Cited in the file of this patent

UNITED STATES PATENTS

| | | |
|---|---|---|
| 798,860 | Allen | Sept. 5, 1905 |
| 973,132 | Northrop | Oct. 18, 1910 |
| 2,754,852 | Moore | July 17, 1956 |
| 2,847,037 | Picanol | Aug. 12, 1958 |

FOREIGN PATENTS

| | | |
|---|---|---|
| 543,727 | Belgium | Jan. 14, 1956 |

OTHER REFERENCES

"3 New Foams" "Modern Plastics," vol. 30, No. 8, April 1953, pages 85–87.